March 5, 1968     K. C. ADAMS ET AL     3,371,945

ADJUSTABLE LIFT LINK

Filed June 6, 1966

Inventors
Kenneth C. Adams
Gerald W. Bernhoft
By Kenneth Mckiver
Attorney 3,371,945
ADJUSTABLE LIFT LINK
Kenneth C. Adams and Gerald W. Bernhoft, Wauwatosa, Wis., assignors to Allis-Chalmers Manufacturing Company, Wauwatosa, Wis.
Filed June 6, 1966, Ser. No. 555,602
4 Claims. (Cl. 280—461)

ABSTRACT OF THE DISCLOSURE

An adjustable lift link for use with hitching devices on a tractor.

The present invention relates generally to agricultural implements and more particularly to hitch devices for connecting an agricultural implement with a tractor to be propelled thereby.

It is a further feature of this invention to provide an adjusting mechanism for the lift link wherein there are only a few parts and these are constructed and arranged as to be simple to assemble into an operative structure and economical to manufacture and maintain.

A further object of this invention is to provide adjustable crank handles for the adjustable lift links of a tractor hitch and means for retaining such handles in nonoperative position to thereby avoid possible contact between said handles and said tractor when the lift links are raised.

It is a further object of this invention to provide a low cost spring wire latch means for maintaining the adjusting handle of a lift link in its folded position and securing the lift link against substantial rotative movement out of its selected position.

Other objects and advantages of the present invention will be apparent to those skilled in the art after a consideration of the following detailed description, taken in conjunction with the accompanying drawings, in which.

Figure 1:
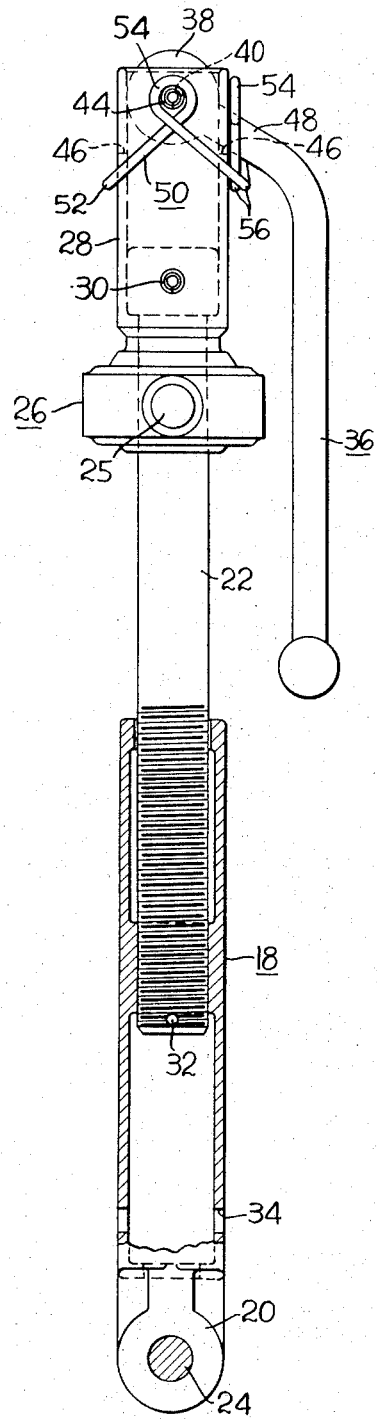
FIG. 1 is a plan view of a tractor lift link embodying the invention.

Referring first to FIG. 1, and considering that this invention is concerned with a tractor hitch device of the type shown in U.S. 3,238,809, and to which reference may be had as to further details of the ditch device if desired, a tractor (not shown) is provided with a conventional 3 point hitch which includes two lower links (not shown). Such tractor is also provided with a power lift mechanism that includes two lift arms (not shown), one on each side of the tractor, connected through adjustable lift links 18 with the two lower links of the tractor 3 point hitch linkage.

The present disclosure is particularly concerned with the adjustable lift links 18 which include a lower clevis 20 and an upper adjusting screw 22. The lower clevis 20 is pivotally connected to the lower links of the tractor by means of pins 24 while the upper adjusting screw 22 is universally connected to the tractor lift arms by means of trunnion 25 of trunnion assembly 26. Adjusting screw 22 is secured to the barrel portion 28 of the trunnion 26 by means of a pin 30. A pin 32 in the threaded lower end of the adjusting screw 22 and assembled through opening 34 in the clevis 20 is provided to act as a stop or limiting member to the excessive extension of lift link 18.

An adjusting handle 36 is provided with a ball shaped mounting portion 38 which is apertured at 40 to align with openings 42 in the barrel portion 28 of the trunnion assembly 26 to receive pin 44. The barrel portion 28 of the trunnion 26 is also provided with open ended slots 46 at the upper end thereof to receive the shank portion 48 of the handle 36. One of the slots 46 receives the shank 48 when the handle is folded downwardly next to the lift link 18 (see FIG. 1) while the other slot may receive the shank 48 when the handle is raised and is in its extended operating position (see FIG. 3).

Figure 2:
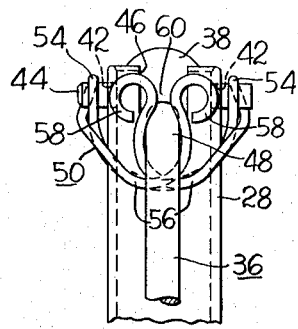
FIG. 2 is a fragmentary side elevation of the tractor lift link shown in FIG. 1 with an operating handle in non-operative position.
Figure 3:
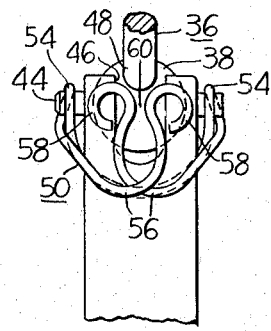
FIG. 3 is a view similar to FIG. 2 with the operating handle positioned for operation.
Figure 4:
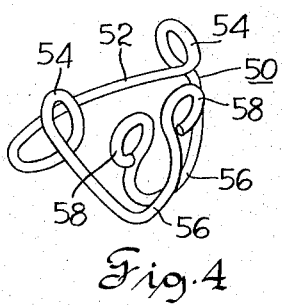
FIG. 4 is a perspective view of the spring latch member shown in the other views.

A one piece latch or locking member 50 for the pivoted handle 36, see FIG. 4, is formed of spring wire and includes a back loop portion 52 with each end of the loop extending upwardly forming a single loop 54 around the outwardly projecting ends of pin 44 (see FIGS. 2 and 3). The two ends of the wire extend downwardly from the pin 44 around the front of trunnion assembly 26 crossing each other and extending upwardly to form two crossed front loops 56 with the free ends of the loops terminating in eyes 58 (see FIG. 4). It is to be noted that both the back loop 52 and the two front loops 56 see FIG. 1) extend downwardly below the slots 46 in the trunnion 26 so as not to interfere with the handle 36 entering the slots. It should also be noted that the front loops 56 cooperate to provide a pocket 60 with the upper eyes being relatively close together and in the same plane due to one of the loops 56 being offset inwardly to compensate for the thickness of the wire from which locking member 50 is formed. When the handle 36 is pivoted downwardly, its shank position 48 contacts the spring eyes 58 spreading the resilient front loops 56 apart so that the handle is received in the pocket 60 and held therein by the resiliency of the spring wire. The spring latch 50 is held against rotation in either an upward or downward direction by the back loop 52 and front loops 56 therefore any downward or upward force will cause the free ends of the spring to move apart rather than rotate about the axis of the mounting pin 44.

It is now apparent that a new and improved means for easily and conveniently rotating the adjusting screw 22 when length adjustment of the lift links is desired, for holding the rotatable member 22 against rotation when changes in the length of the lift links is not desired and for pivoting and resiliently holding the crank handle in a compact folded position where it will not interfere with other parts of the tractor when the lift links are raised. The spring latch is of simple one piece construction, is easily assembled and replaced, and eliminates the need of a special mounting by utilizing the crank handle pivot pin for this purpose.

The embodiments of the invention in which an exclusive property or privilege is claimed are defined as follows:

1. In a hitch device, a lift link structure including a universally supported trunnion connected to lift arms on a tractor and including a clevis connected to lower draft arms of a tractor, the improvement comprising said lift link including means for varying the length thereof by a relative rotation of parts, an operating lever pivotally connected to said lift link by means of a pivot pin and being positionable for turning a portion of said link for lengthening or shortening same, said operating lever also being positionable in an inoperative position with its handle portion extending parallel to said link, a locking spring fastened to said pin and surrounding said link having opposed portions for resiliently retaining said operating lever in said inoperative position.

2. A hitch device as called for in claim 1 and wherein said locking spring comprises a one piece formed spring wire structure having loop portions surrounding the ends of said pivot pin and having crossed over portions terminating in said opposed portions contacting said operating lever when positioned in its inoperative position.

3. A hitch device as called for in claim 2 and wherein said lift arm is provided with a slot for receiving said operating lever when same is moved to said inoperative position and said locking member is provided with back and front loops positioned below said slot and preventing movement of said locking member about said pin as said operating lever is moved from operative to inoperative position.

4. A hitch device according to claim 3 and wherein said operating lever is pivotally connected to the upper end of said lift link and above said trunnion.

References Cited

UNITED STATES PATENTS

| 1,059,884 | 4/1913 | Link. | |
|---|---|---|---|
| 1,300,384 | 4/1919 | Hanahan | 74—547 |
| 2,920,500 | 1/1960 | Edman | 74—547 X |
| 3,238,809 | 3/1966 | Beard | 74—504 |
| 3,334,692 | 8/1967 | Morkoski | 280—460.1 X |

OTHER REFERENCES

John Deere 2010 Gasoline Wheel Tractor, Operator's Manual, Manual No.: OM–T–15371T; pp. 23, 28.

LEO FRIAGLIA, *Primary Examiner.*